(12) United States Patent
Thompson et al.

(10) Patent No.: US 10,210,699 B2
(45) Date of Patent: *Feb. 19, 2019

(54) SNAP-AND-CLICK DISPLAY

(71) Applicant: Cadillac Jack, Inc., Duluth, GA (US)

(72) Inventors: Mark Andrew Thompson, Buford, GA (US); Prashant L. Shah, Elk Grove Village, IL (US)

(73) Assignee: AGS LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,902

(22) Filed: Jan. 13, 2017

(65) Prior Publication Data

US 2017/0132870 A1 May 11, 2017

Related U.S. Application Data

(63) Continuation of application No. 13/725,165, filed on Dec. 21, 2012, now Pat. No. 9,573,050.

(51) Int. Cl.
*G07F 17/32* (2006.01)
*A63F 13/90* (2014.01)

(52) U.S. Cl.
CPC .......... *G07F 17/3211* (2013.01); *A63F 13/90* (2014.09); *G07F 17/323* (2013.01); *G07F 17/3216* (2013.01); *G07F 17/3288* (2013.01); *Y10T 29/49876* (2015.01)

(58) Field of Classification Search
CPC ............... G07F 17/3211; G07F 17/323; G07F 17/3216; G07F 17/3288
See application file for complete search history.

(56) References Cited

U.S. PATENT DOCUMENTS

| | | | |
|---|---|---|---|
| 4,440,457 A | 4/1984 | Fogelman et al. | |
| 4,856,088 A * | 8/1989 | Oliwa ................ | G08B 5/225 340/7.54 |
| 4,948,138 A | 8/1990 | Pease et al. | |
| D333,164 S | 2/1993 | Kraft et al. | |
| 5,537,149 A | 7/1996 | Teraoka et al. | |
| 5,575,544 A * | 11/1996 | Hasegawa .......... | H04B 1/082 312/7.1 |
| 5,696,529 A * | 12/1997 | Evanicky .......... | G02B 6/0056 345/102 |
| 5,813,914 A | 9/1998 | McKay et al. | |
| 5,951,128 A | 9/1999 | Aidone et al. | |
| D424,122 S | 5/2000 | Dickenson et al. | |
| 6,334,612 B1 | 1/2002 | Wurz et al. | |
| D459,402 S | 6/2002 | Wurz et al. | |

(Continued)

OTHER PUBLICATIONS

Sony; Sony XAV601BT Manual—Detaching and attaching the front panel; esupportsony.com; https://esupportsony.com/US/p/model-home.pl?mdl=XAV601BT&template_id=1&region_id=1&tab=manuals#/manualsTab; 2 pages; downloaded Dec. 20, 2016.

(Continued)

*Primary Examiner* — Dmitry Suhol
*Assistant Examiner* — Carl V Larsen
(74) *Attorney, Agent, or Firm* — Weide & Miller, Ltd.

(57) ABSTRACT

Examples disclosed herein relate to a snap-and-click display utilized to enhance the installation of a display on an electronic gaming device. The systems and methods may allow for easier installation of a display on the electronic gaming device via a snap-and-click display.

13 Claims, 19 Drawing Sheets

(56) References Cited

U.S. PATENT DOCUMENTS

| | | | |
|---|---|---|---|
| D460,915 S | 7/2002 | Lynch | |
| 6,443,837 B1 | 9/2002 | Jaffe et al. | |
| D464,377 S | 10/2002 | Wurz et al. | |
| 6,475,087 B1 | 11/2002 | Cole | |
| 6,545,863 B2 | 4/2003 | Huggins | |
| 6,578,847 B1 | 6/2003 | Hedrick et al. | |
| 6,702,409 B2 | 3/2004 | Hedrick et al. | |
| D495,755 S | 9/2004 | Wurz et al. | |
| D496,407 S | 9/2004 | Gadda et al. | |
| 6,860,814 B2* | 3/2005 | Cole | A63F 13/08 273/138.1 |
| 6,935,946 B2 | 8/2005 | Yoseloff et al. | |
| 6,976,915 B2 | 12/2005 | Baker et al. | |
| 6,997,810 B2 | 2/2006 | Cole | |
| 7,130,190 B1 | 10/2006 | Baker | |
| D559,917 S | 1/2008 | Cole | |
| D626,182 S | 10/2010 | Cole et al. | |
| 7,862,436 B2 | 1/2011 | Cole | |
| 7,904,236 B2* | 3/2011 | Ueno | G01C 21/3688 307/10.1 |
| 8,016,682 B2 | 9/2011 | Stephenson, III et al. | |
| 8,016,683 B2* | 9/2011 | Cole | G07F 17/32 273/138.1 |
| 8,082,559 B2* | 12/2011 | Yamada | B60R 11/0205 720/647 |
| 2002/0022509 A1 | 2/2002 | Nicastro | |
| 2002/0030966 A1 | 3/2002 | Huggins | |
| 2002/0183105 A1 | 12/2002 | Cannon et al. | |
| 2004/0018870 A1 | 1/2004 | Cole | |
| 2004/0166937 A1 | 8/2004 | Rothschild et al. | |
| 2004/0207156 A1 | 10/2004 | Soltys et al. | |
| 2005/0213295 A1* | 9/2005 | Perez | G06F 1/181 361/679.57 |
| 2005/0215325 A1* | 9/2005 | Nguyen | G07F 17/32 463/46 |
| 2005/0288090 A1 | 12/2005 | Thomas et al. | |
| 2006/0073900 A1 | 4/2006 | Cole | |
| 2006/0131810 A1 | 6/2006 | Nicely | |
| 2007/0225079 A1 | 9/2007 | Cole | |
| 2007/0295020 A1 | 12/2007 | Lee | |
| 2008/0113819 A1 | 5/2008 | Tedsen et al. | |
| 2010/0173704 A1 | 7/2010 | Cole | |
| 2010/0188808 A1 | 7/2010 | Howarth et al. | |
| 2011/0058326 A1* | 3/2011 | Idems | G09F 9/30 361/679.21 |
| 2011/0151958 A1 | 6/2011 | Cole | |
| 2012/0062211 A1 | 3/2012 | Neal et al. | |
| 2012/0302358 A1 | 11/2012 | Cole | |
| 2012/0322564 A1 | 12/2012 | Granger | |
| 2013/0023346 A1 | 1/2013 | Greenberg | |
| 2013/0079157 A1 | 3/2013 | Chudek | |
| 2014/0179422 A1 | 6/2014 | Thompson et al. | |

OTHER PUBLICATIONS

Sony XAV601BT. Amazon.com. Online. Accessed via the Internet. Accessed Nov. 13, 2013. <URL: http://www.amazon.com/Sony-XAV601BT-Bluetooth-MirrorLink-Technology/dp/B0086V637Y#produceDetails>; 8 pages.

Sony; Sony XAV601BT Operating Instructions; esupport.sony.com; https://esupport.sony.com/US/p/model-home.pl?mdl=XAV601BT&template_id=1&region_id=1&tab=manuals#/manualsTab; 71 pages; Copyright 2012.

Dirak Inc. 1-046SL Fastener Snap-Line 30×10. http://www.bdproduct.ca/wp-content/uploads/2013/06/Dirak-Fasteners-22.pdf. Copyright Oct. 1, 2012. 1 Page.

* cited by examiner

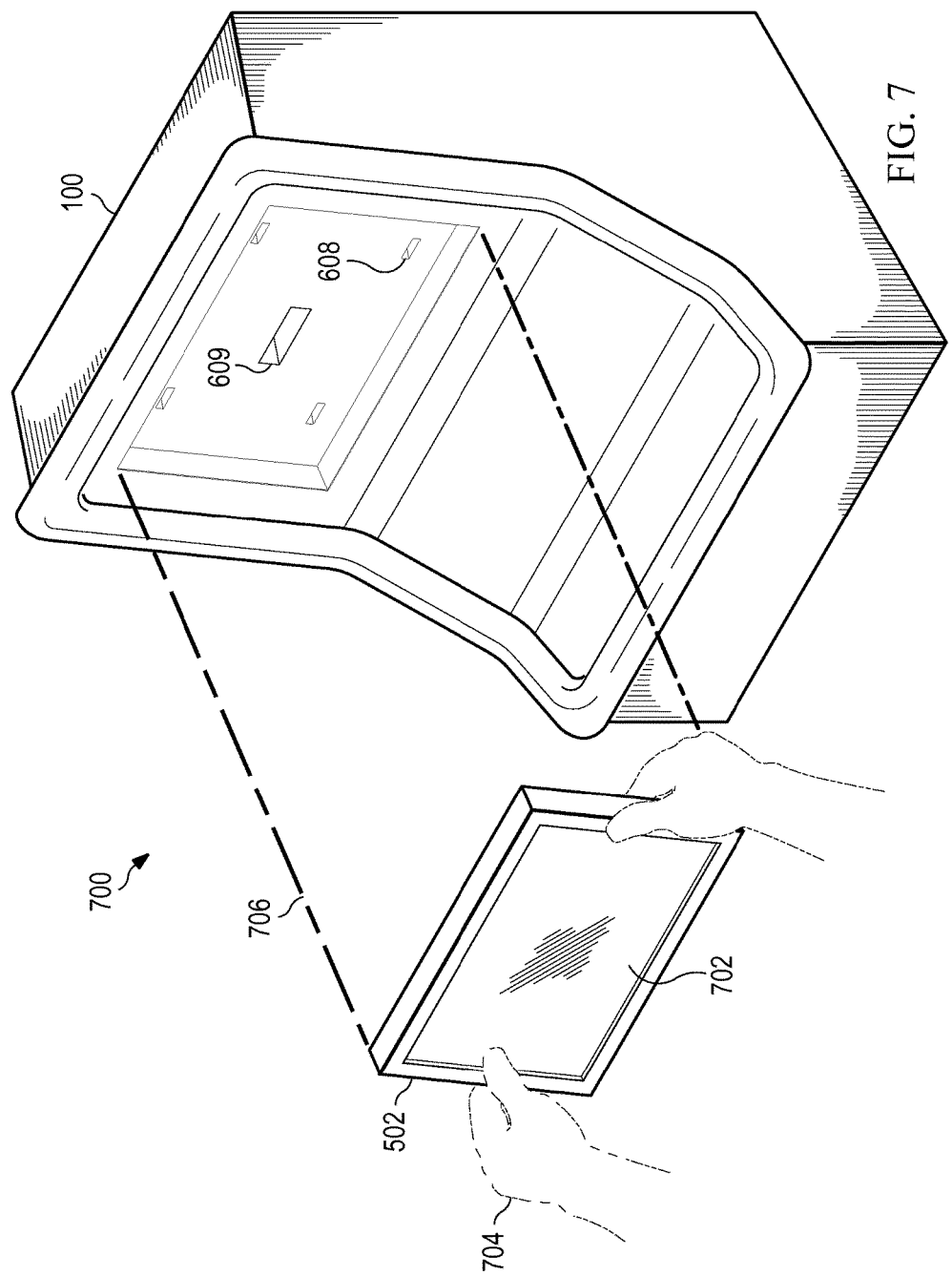

SNAP-AND-CLICK DISPLAY

RELATED APPLICATION DATA

This application is a continuation of U.S. patent application Ser. No. 13/725,165, filed Dec. 21, 2012. The present application claims priority to the said application and incorporates by reference the said application as if set forth fully herein.

FIELD OF THE INVENTION

The subject matter disclosed herein relates to an electronic gaming device. More specifically, the disclosure relates to a snap-and-click display for the electronic gaming device.

BACKGROUND OF THE INVENTION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successfully matches the predetermined winning symbols in one of the predetermined patterns.

When manufacturing, modifying, and/or repair an electronic gaming machine installing and/or changing the display screen can be an inefficient process. By utilizing a snap-and-click display this process may be improved.

DESCRIPTION OF THE DRAWINGS

Non-limiting and non-exhaustive examples will be described with reference to the following figures, wherein like reference numerals refer to like parts throughout the various figures.

FIG. 7 is another illustration of the display interface in the electronic gaming machine for the snap-and-click display, according to one embodiment.

DETAILED DESCRIPTION OF THE INVENTION

Figure 1:
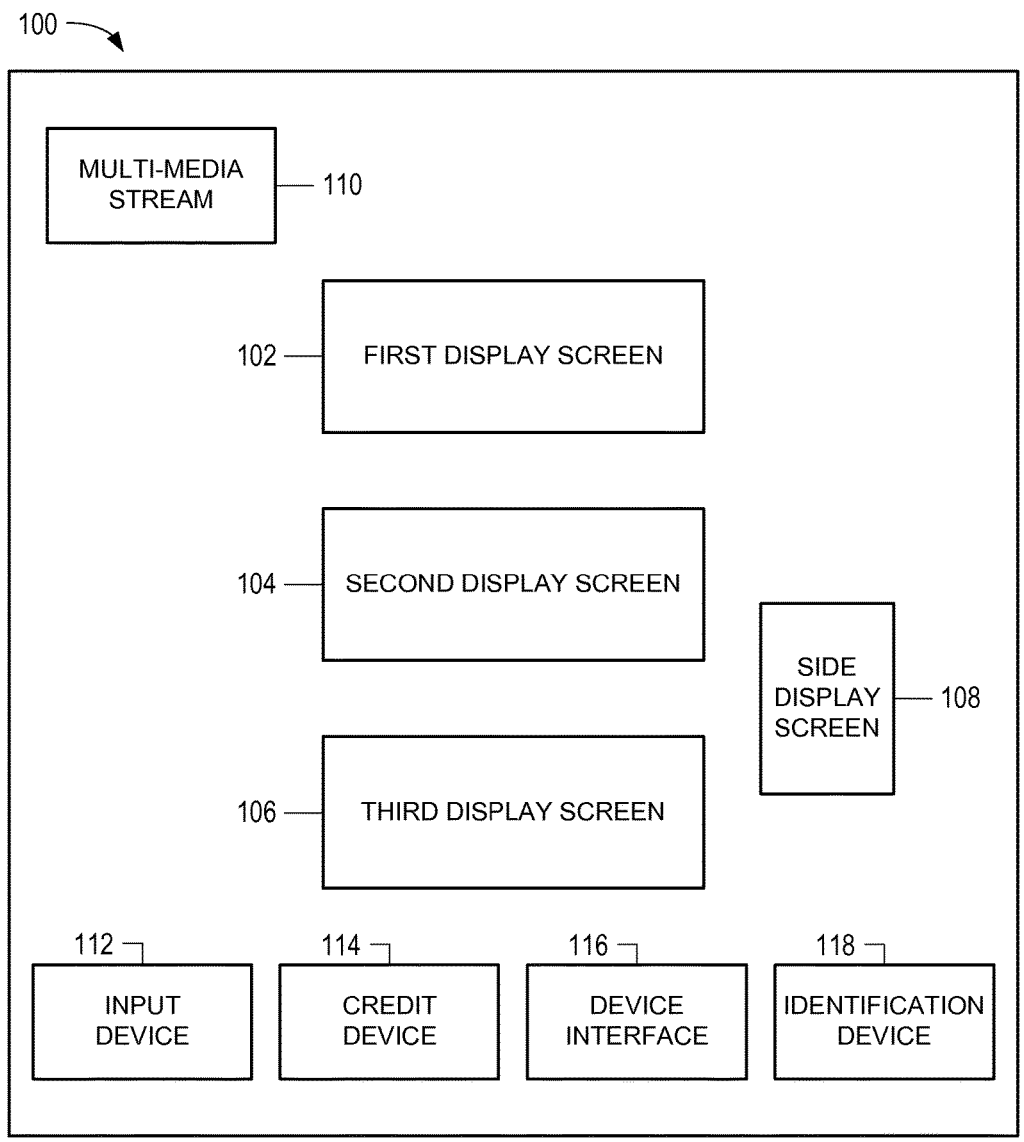
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to verify one or more parameters relating to snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216, to unlock one or more of snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216, to make a wager, to control any object, to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more game functionalities (e.g., game type 1, game type 2, game type 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLEO"), plasma display panel ("PDP"), electroluminescent display ("ELD"), a light-emitting diode display ("LED"), or any other display technology. First display screen 102 may be used for displaying primary games or secondary (bonus) games, to display one or more warnings relating to snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multimedia data, which may be displayed on any display combination.

Figure 2:
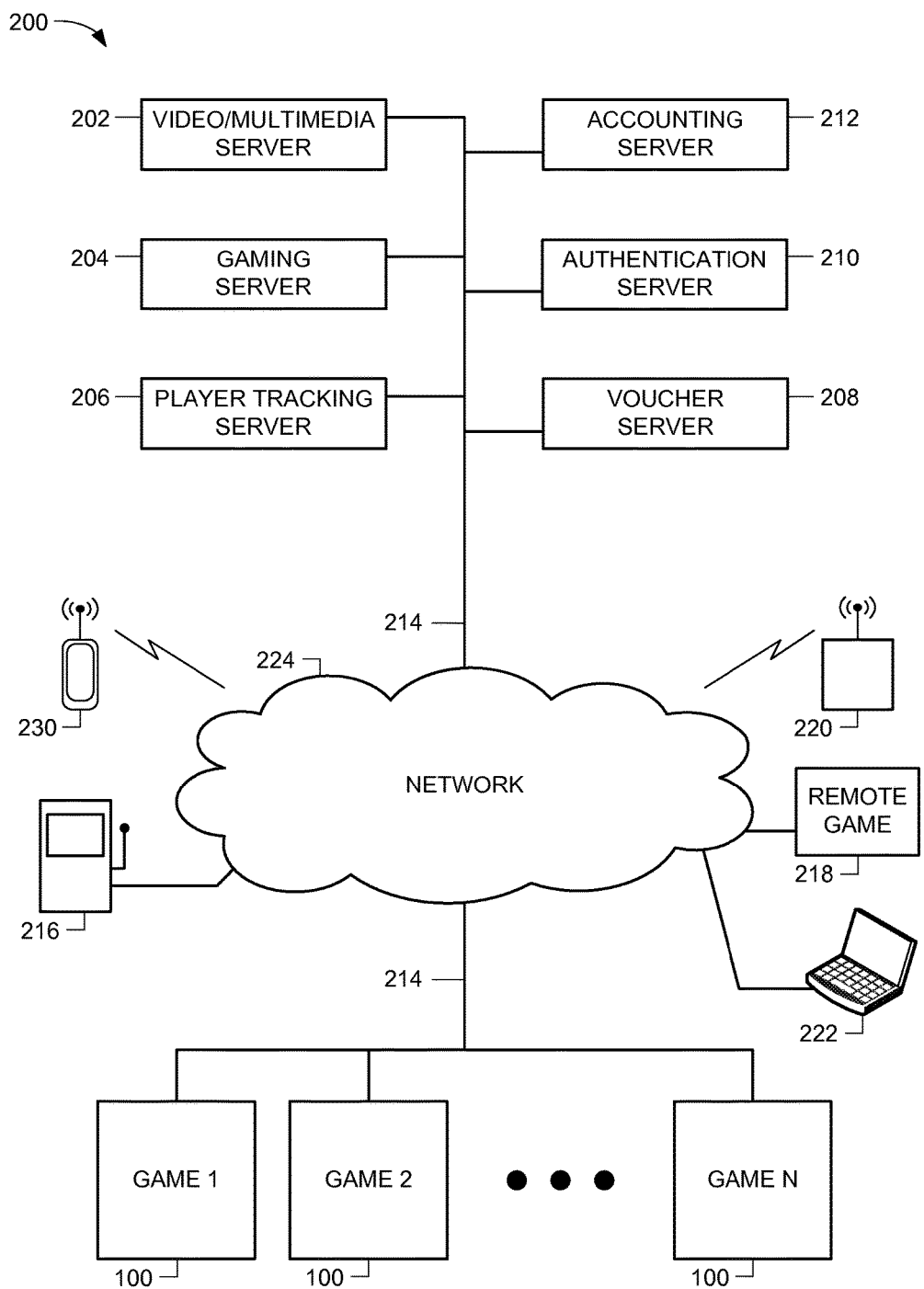
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a game play functionality, a game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Figure 3:
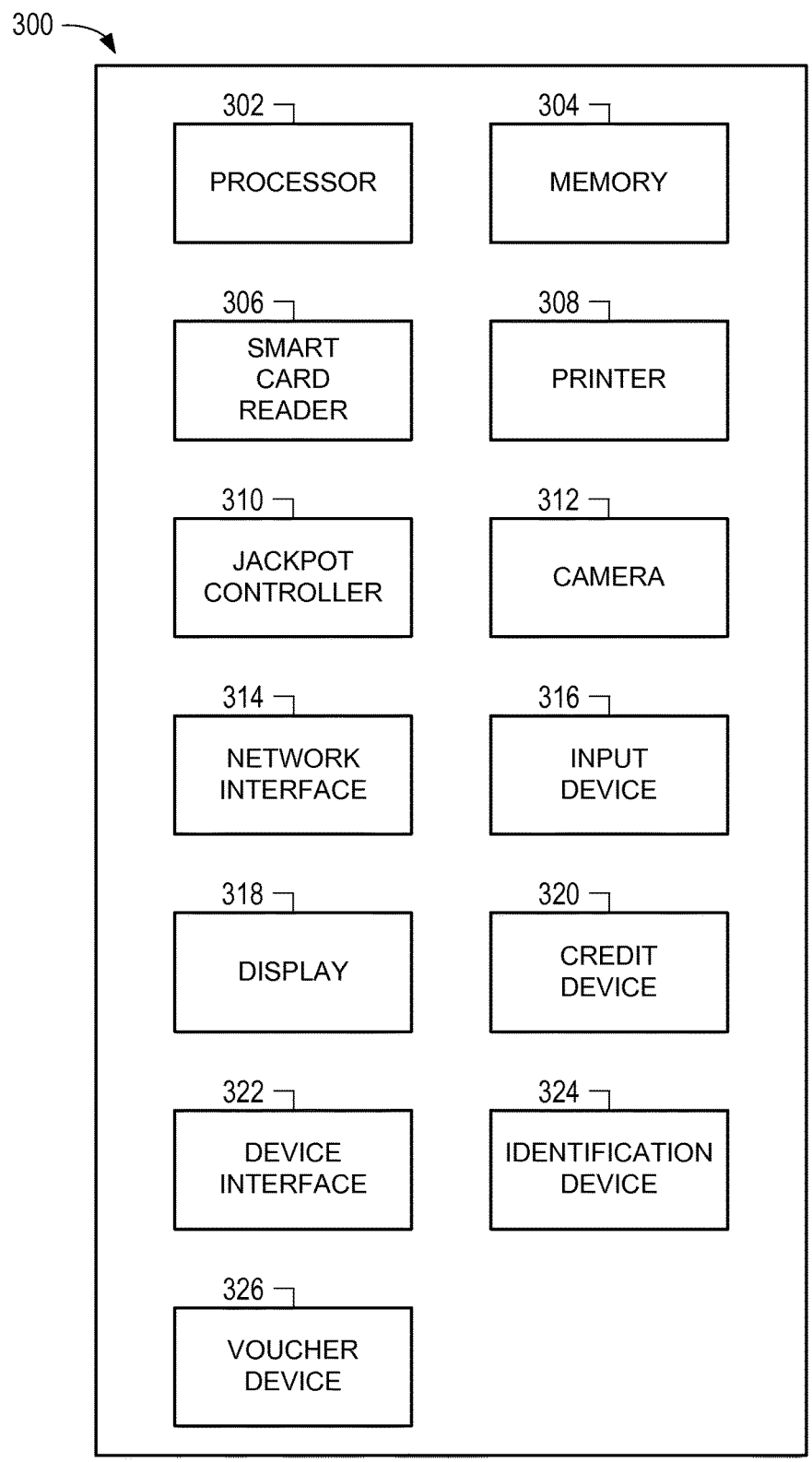
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more game elements, to select one or more gaming options, to make an offer to buy or sell a voucher, to determine a voucher's worth, to cash in a voucher, to modify electronic gaming device 100 (e.g., change sound level, configuration, font, language, etc.), to modify one of snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216, to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
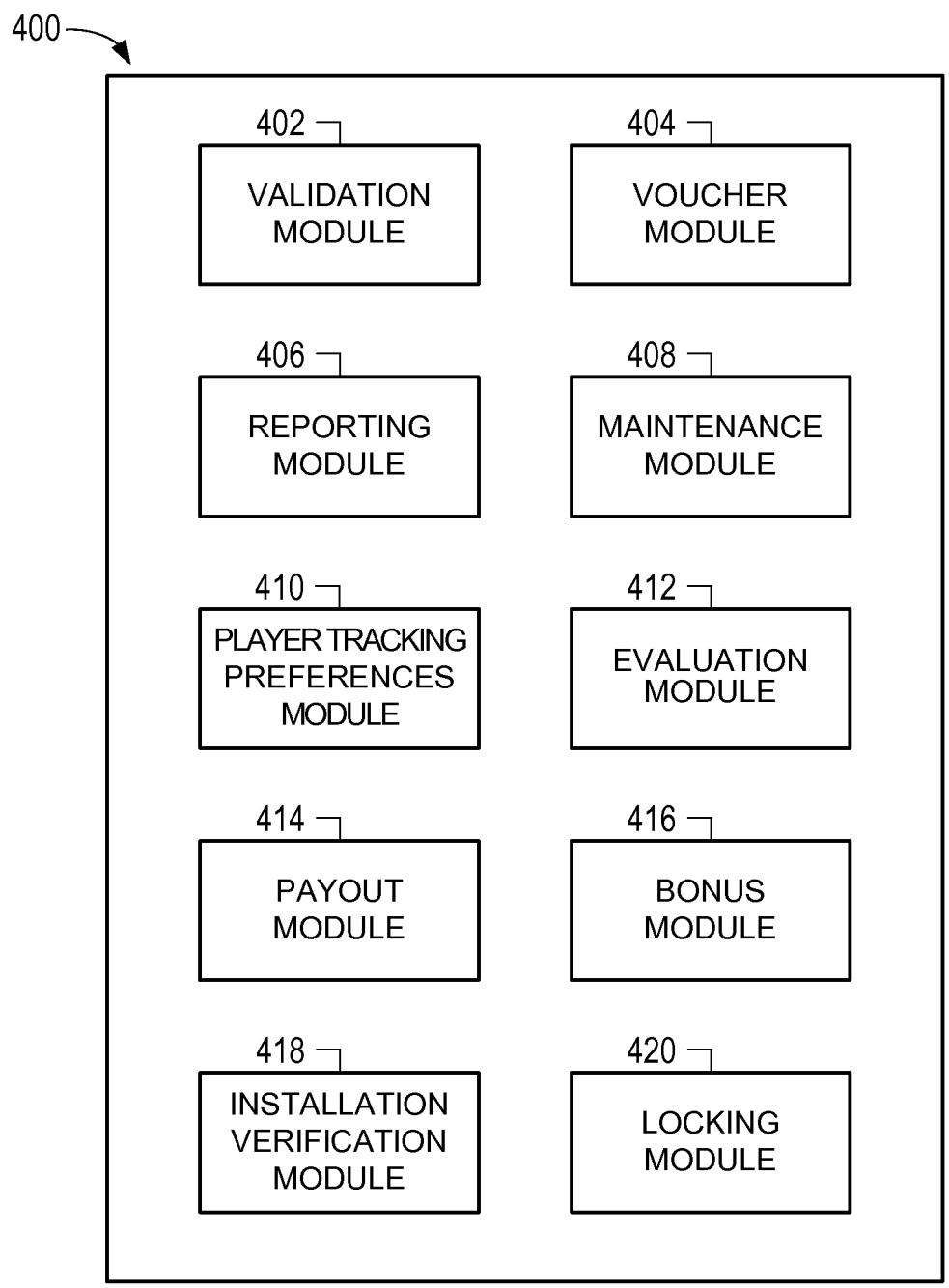
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, a bonus module 416, an installation verification module 418, and a locking module 420.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events relating to game play.

Payout module 414 may determine one or more payouts which may relate to one or more inputs received from the player, electronic gaming device 100, and/or electronic gaming system 200.

Bonus module 416 may generate a bonus game, evaluate the results of the bonus game, trigger bonus game presentations, generate bonus game payouts, and/or display any data relating to the bonus game.

Installation verification module 418 may verify the installation parameters on one or more of snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216. Installation verification module 418 may generate, store, and/or transmit a warning based on comparing data received from one or more sensors relating to one or more of snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216 to one or more reference data points. These warnings may be transmitted to an external device, a server, a mobile device, and/or a warning display on electronic gaming device 100.

Locking module 420 may control the locking mechanism for one or more of snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216. Locking module 420 may control any locking mechanism for electronic gaming device 100. Locking module 420 may generate a warning when a locking data point is outside of a specific parameter. These warnings may be transmitted to an external device, a server, a mobile device, and/or a warning display on electronic gaming device 100.

It should be noted that one or more modules may be combined into one module. Further, there may be one evaluation module where the determined payout does not depend on whether there were any wild symbols, scatter symbols, platform based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5:
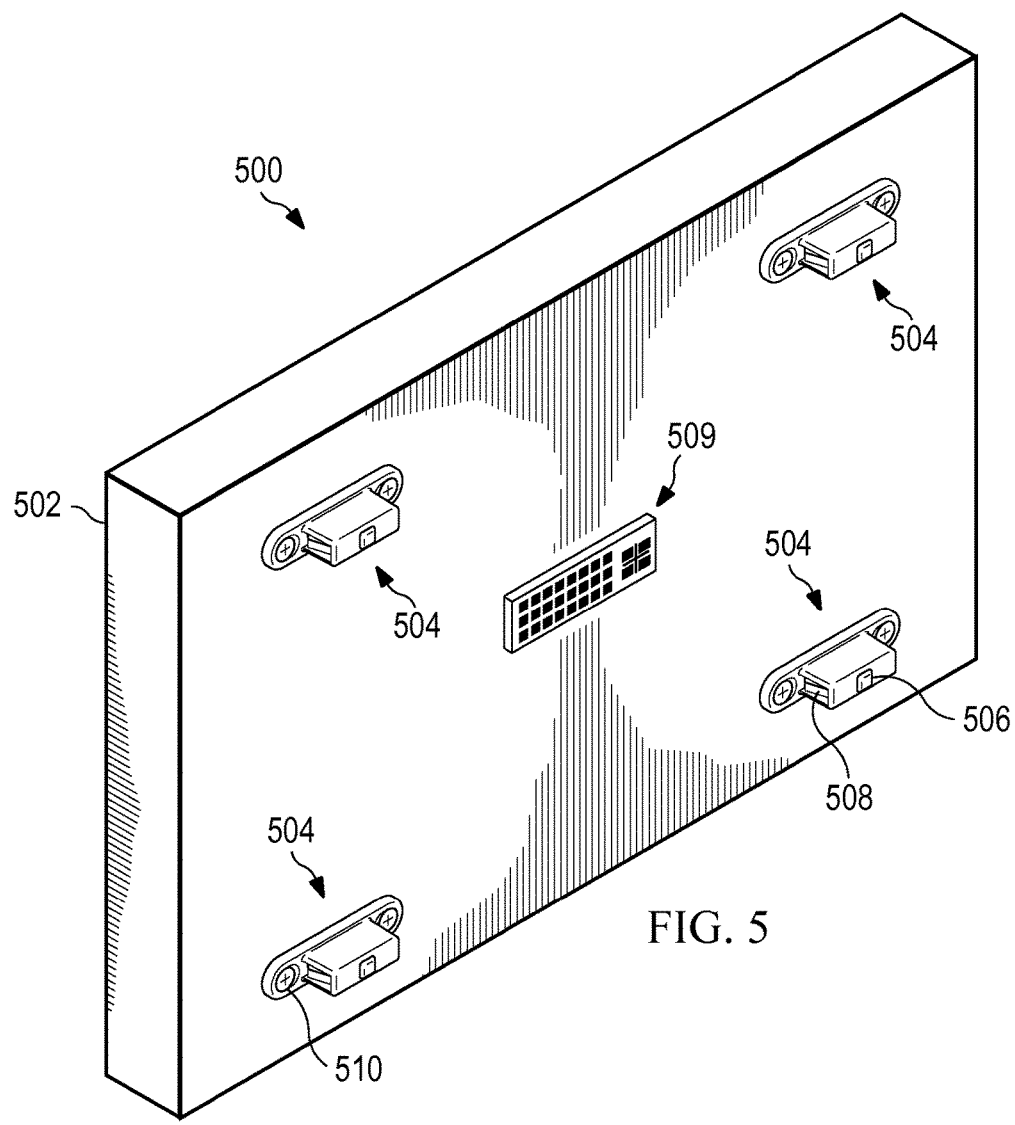
FIG. 5 is an illustration of the snap-and-click display, according to one embodiment.

In FIG. 5, an illustration of the snap-and-click display 500 is shown, according to one embodiment. A snap-and-click display 502 may include a snap-and-click display screen 702, snap-and-click device 504, and/or one or more electrical attachment devices 509. Snap-and-click device 504 may include one or more attachment areas 510, a snap-and-click locking device 508, and/or a snap-and-click unlocking device 506.

One or more attachment areas 510 may be utilized to connect snap-and-click device 504 to snap-and-click display 502. One or more attachment areas 510 may be connected via screws, nuts, bolts, glue, and/or any other securing means.

Figure 6:
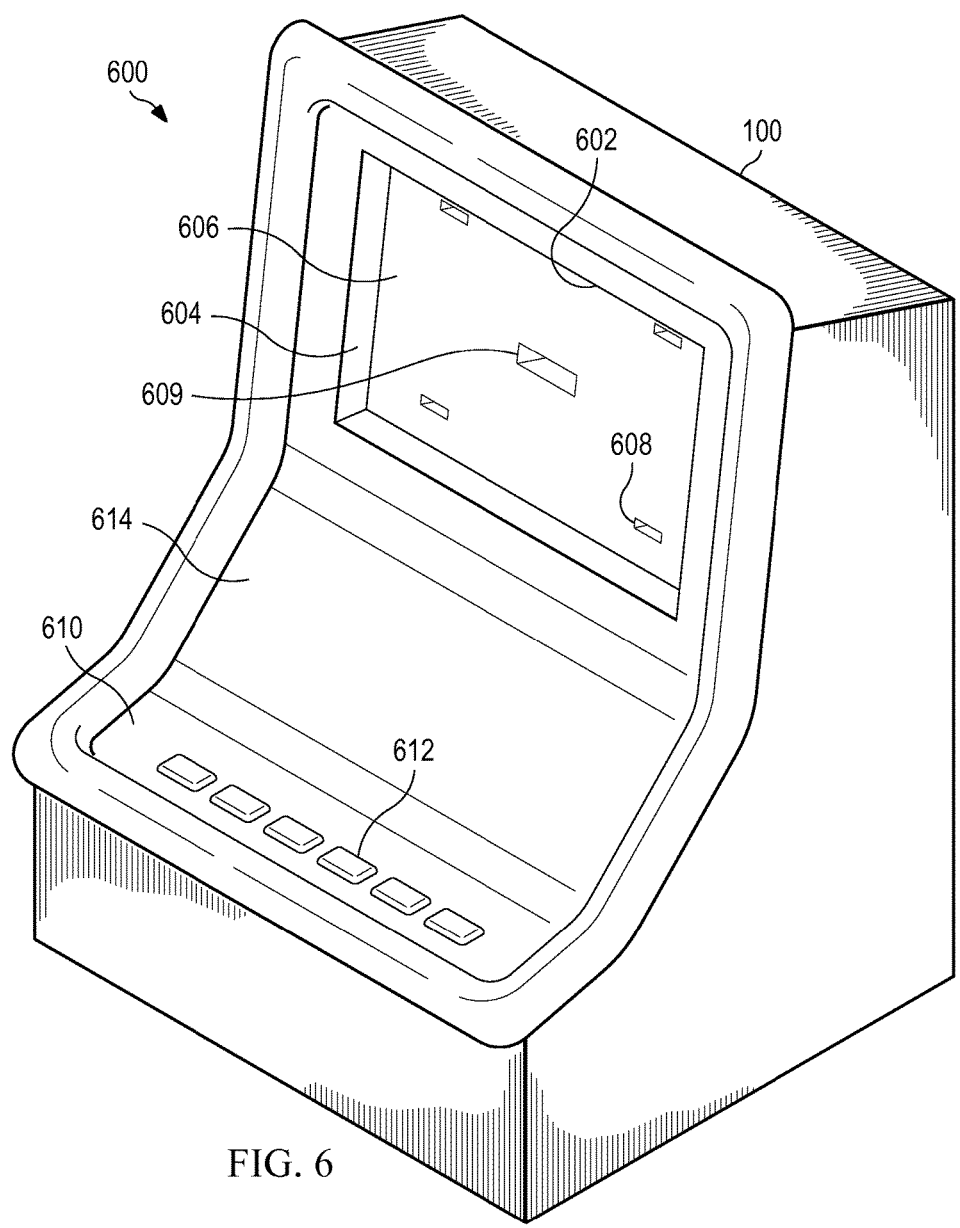
FIG. 6 is an illustration of the display interface in the electronic gaming machine for the snap-and-click display, according to one embodiment.

One or more electrical attachment devices 509 may be utilized to electrically connect snap-and-click display 502 to electronic gaming device 100, electronic gaming system 200, a display installation area 602, a wall of the display installation area 604, a back of the display installation area 606, one or more snap-and-click display interfaces 608, and/or one or more electrical attachment points 609 (see FIG. 6).

Snap-and-click locking device 508 may be connected to electronic gaming device 100 via an interface. Snap-and-click locking device 508 may be connected to electronic gaming device 100 without an interface. Snap-and-click locking device 508 may be connected by applying pressure to snap-and-click locking device 508, which compresses snap-and-click locking device 508. Snap-and-click locking device 508 is then passed through an attachment opening. Once snap-and-click locking device 508 has passed through the attachment opening, the pressure is released from snap-and-click locking device 508 which then opens back up and is locked in place.

Snap-and-click unlocking device 506 may compress snap-and-click locking device 508, which allows snap-and-click locking device 508 to be unlocked from one or more connected devices.

FIG. 6 is an illustration of the interface in the electronic gaming machine for the snap-and-click display, according to one embodiment. A first image 600 may include electronic gaming device 100, display installation area 602, wall of the display installation area 604, back of the display installation area 606, one or more snap-and-click display interfaces 608, one or more electrical attachment points 609, an input area 610, one or more input devices 612, and a second display 614.

One or more electrical attachment points 609 may be utilized to electrically connect snap-and-click display 502 to electronic gaming device 100, electronic gaming system 200, display installation area 602, wall of the display installation area 604, back of the display installation area 606, one or more snap-and-click display interfaces 608, one or more electrical attachment devices 509 and/or any other electrical device.

In one example, display installation area 602 is where snap-and-click display 502 is installed. In another example, wall of the display installation area 604 may have the same depth as snap-and-click display 502 to create a flush surface. Back of the display installation area 606 may be where snap-and-click display 502 is supported. Back of the display installation area 606 may include one or more snap-and-click display interfaces 608. One or more snap-and-click display interfaces 608 may allow for snap-and-click device 504 to be located/positioned within the snap-and-click display interface 608 to form a connection between snap-and-click display 502, snap-and-click device 504, snap-and-click interface 608, back of the display installation area 606, one or more electrical attachment devices 509, and/or one or more electrical attachment points 609.

In FIG. 7, another illustration of the interface in the electronic gaming machine for the snap-and-click display is shown, according to one embodiment. A second image 700 may include electronic gaming device 100, one or more snap-and-click display interfaces 608, one or more electrical attachment points 609, snap-and-click display 502, snap-and-click display screen 702, one or more alignment lines 706, and a hand 704. A person via hand 704 may utilize one or more alignment lines 706 (or other alignment procedures) to place snap-and-click display 502 via snap-and-click device 504 into one or more snap-and-click display interfaces 608. Further, one or more alignment lines 706 are imagery lines to demonstrate the plane for installation. In another example, a machine may utilize one or more alignment lines 706 to place snap-and-click display 502 via snap-and-click device 504 into one or more snap-and-click display interfaces 608.

A person via hand 704 may utilize one or more alignment lines 706 (or other alignment procedures) to connect one or more electrical attachment points 609 on display installation area 602 to one or more electrical attachment devices 509 on snap-and-click display 502. In another example, a machine may utilize one or more alignment lines 706 to connect one or more electrical attachment points 609 on display installation area 602 to one or more electrical attachment devices 509 on snap-and-click display 502.

One or more electrical attachment points 609 may be utilized to electrically connect snap-and-click display 502 to electronic gaming device 100, electronic gaming system 200, display installation area 602, wall of the display installation area 604, back of the display installation area 606, one or more snap-and-click display interfaces 608, and/or one or more electrical attachment devices 509.

Figure 8:
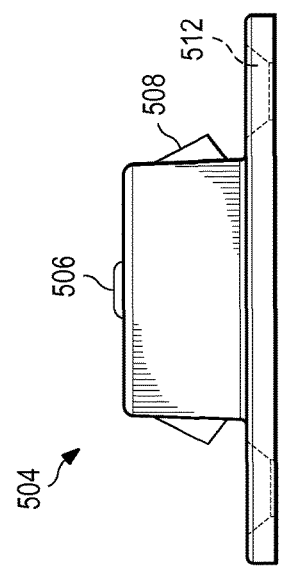
FIG. 8 is an illustration of the snap-and-click locking mechanism, according to one embodiment.

FIG. 8 is an illustration of the snap-and-click locking mechanism, according to one embodiment. Snap-and-click device 504 may include one or more locking areas 512, snap-and-click locking device 508, and snap-and-click unlocking device 506. One or more locking areas 512 may allow a screw, a blot, a nut, and/or any other securing device to be inserted into one or more locking areas 512 to secure snap-and-click device 504 to snap-and-click display 502.

Figure 10:
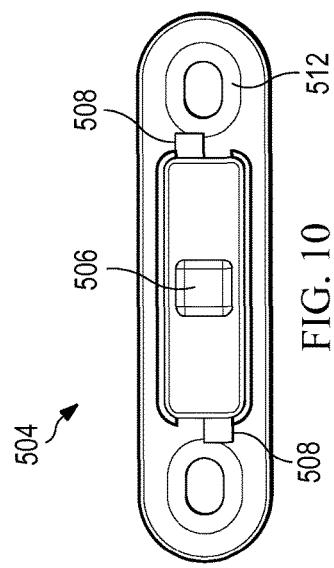
FIG. 10 is another illustration of the snap-and-click locking mechanism, according to one embodiment.

Snap-and-click locking device 508 may be compressed by a material going over snap-and-click locking device 508 (see FIG. 11), which puts snap-and-click locking device 508 into an unlocked position. Once the material has passed over snap-and-click device 508 (see FIGS. 10 and 12), snap-and-click locking device 508 is put into a locked position.

Figure 9:
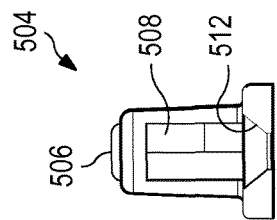
FIG. 9 is another illustration of the snap-and-click locking mechanism, according to one embodiment.
Figure 11:
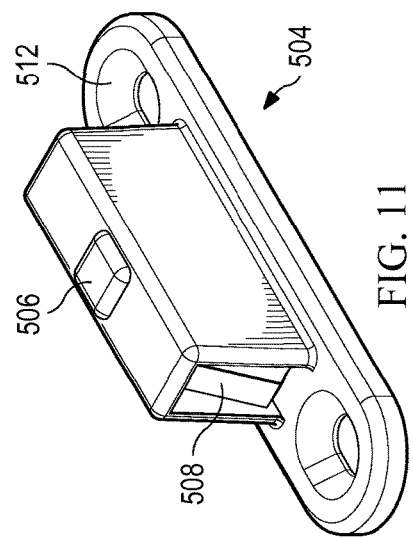
FIG. 11 is another illustration of the snap-and-click locking mechanism, according to one embodiment.
Figure 13:
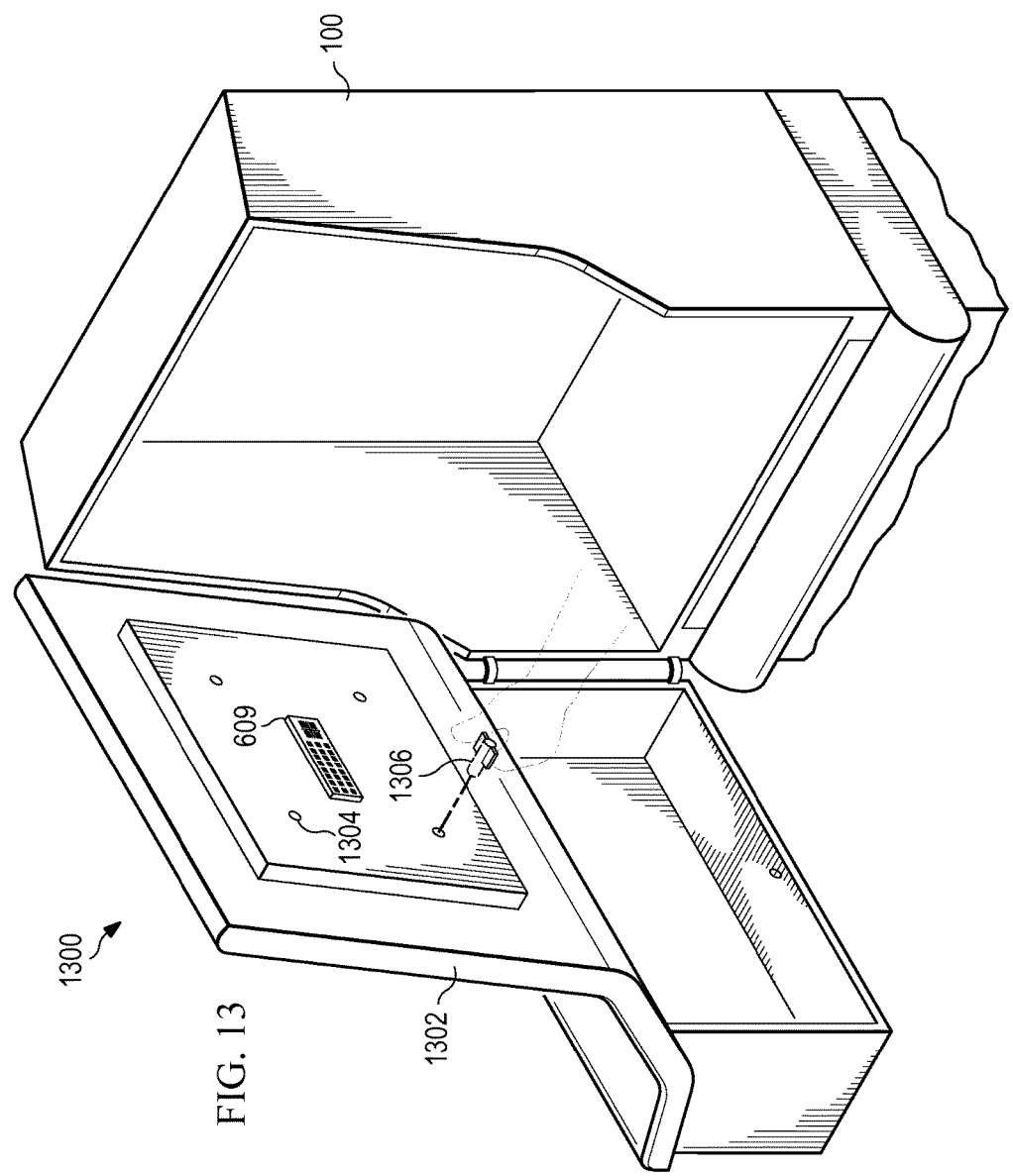
FIG. 13 is an illustration of an unlocking mechanism, according to one embodiment.

In another example, snap-and-click unlocking device 506 may be utilized (e.g., by touching and/or pressing down) to unlock (e.g., place in a compressed position) snap-and-click locking device 508 (see FIGS. 9, 11, and 13).

Figure 12:
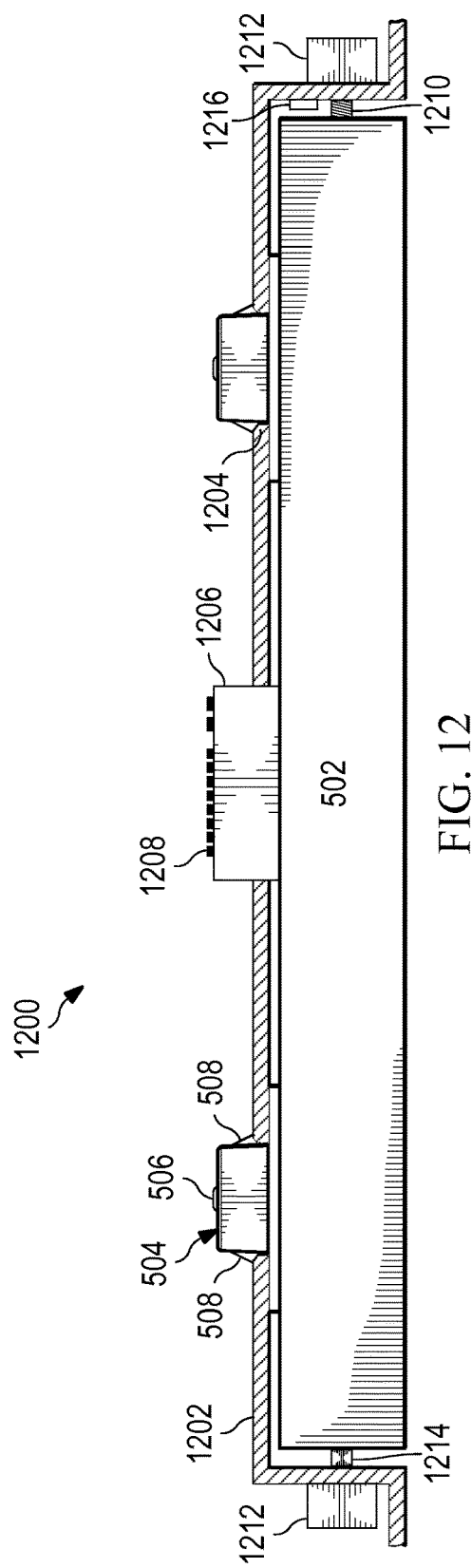
FIG. 12 is an illustration of a locking mechanism for display, display interface, an electrical connection mechanism, and the snap-and-click locking mechanism combination, according to one embodiment.

FIG. 12 is an illustration of a locking mechanism for display, display interface, an electrical connection mechanism, and the snap-and-click locking mechanism combination, according to one embodiment. A third image 1200 may include a display interface 1202, snap-and-click device 504, snap-and-click locking device 508, snap-and-click unlocking device 506, a display interface locked area 1204, one or more electrical interconnection points 1206 (e.g., a combination of one or more electrical attachment points 609 and one or more electrical attachment devices 509), one or more electrical wires 1208, one or more springs 1210, one or more motors 1212, one or more adjustable devices 1214, and one or more sensors 1216. In one example, display interface locked area 1204 shows that snap-and-click locking device 508 has passed over (through) display interface 1202, which compressed (e.g., puts in an open position) snap-and-click locking device 508. Once snap-and-click locking device 508 went through display interface 1202, then snap-and-click locking device 508 opened up (e.g., put in a closed position) to securely attach snap-and-clicking locking device 508 to display interface which can be seen in locking area 1204.

One or more electrical interconnection points 1206 may be a combination of one or more electrical attachment points 609 and one or more electrical attachment devices 509. One or more electrical wires 1208 may be any items which can carry electrical energy and/or data.

One or more springs 1210 may be utilized to manually and/or automatically (e.g., via one or more motors 1214) adjust snap-and-click display 502 to a flush position with the outside of electronic gaming device 100, to a predetermined position, to a floating position, and/or any combination thereof. The flush position may allow snap-and-click display 502 to appear level with the outside of electronic gaming device 100, which gives a high-tech feel to electronic gaming device 100. The predetermined position may be any position (e.g., flush, floating, within one-half of an inch from a flush position with electronic gaming device 100). The floating position may allow for reduced breakage of snap-and-click display 502 when a force is applied to any part of electronic gaming device 100. For example, when the door of electronic gaming device 100 is being closed. The positions of snap-and-click display 502 may be adjusted based on a mode of operation. For example, during installation and repair the floating position may be utilized to minimize breakage of snap-and-click display 502. In another example, during a cleaning operation a first predetermined position may be utilized to have snap-and-click display 502 be outside of electronic gaming device 100 to clean the sides of snap-and-click display 502 and then a second predetermined position may be utilized to have snap-and-click display 502 be inside of electronic gaming device 100 to clean the perimeter of display installation area 606. In another example, during game play the flush position may be utilized to give electronic gaming device 100 a high-tech feel that a player may enjoy. Any of the positions may be adjusted and/or maintained via data feedback from one or more sensors 1216.

One or more adjustable devices 1214 may be utilized in conjunction with and/or replace one or more springs 1210. One or more adjustable devices 1214 and/or one or more springs 1210 may be in any position (e.g., display installation area 602, wall of the display installation area 604, back of the display installation area 606, one or more snap-and-click display interfaces 608, one or more electrical attachment points 609, input area 610, one or more input devices 612, second display 614, etc.).

One or more sensors 1216 may obtain and/or transmit one or more data points (e.g., positional data, temperature data, etc.) relating to snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216 to one or more processors.

FIG. 13 is an illustration of an unlocking mechanism, according to one embodiment. A fourth image 1300 may include an electronic gaming device 100, an electronic gaming device door 1302, one or more snap-and-click release holes 1304, and snap-and-click release tool 1306. In one example, snap-and-click release tool 1306 may be inserted into one or more snap-and-click release holes 1304 to make contact with snap-and-click unlocking device 506, which unlocks snap-and-clicking locking device 508. By unlocking one or more snap-and-clicking locking devices 508, snap-and-click display 502 may be removed. In another example, one or more electrical interconnection points 1206, one or more electrical attachment points 609, and/or one or more electrical attachment devices 509 may be disconnected (e.g., physically and/or electrically).

Figure 14:
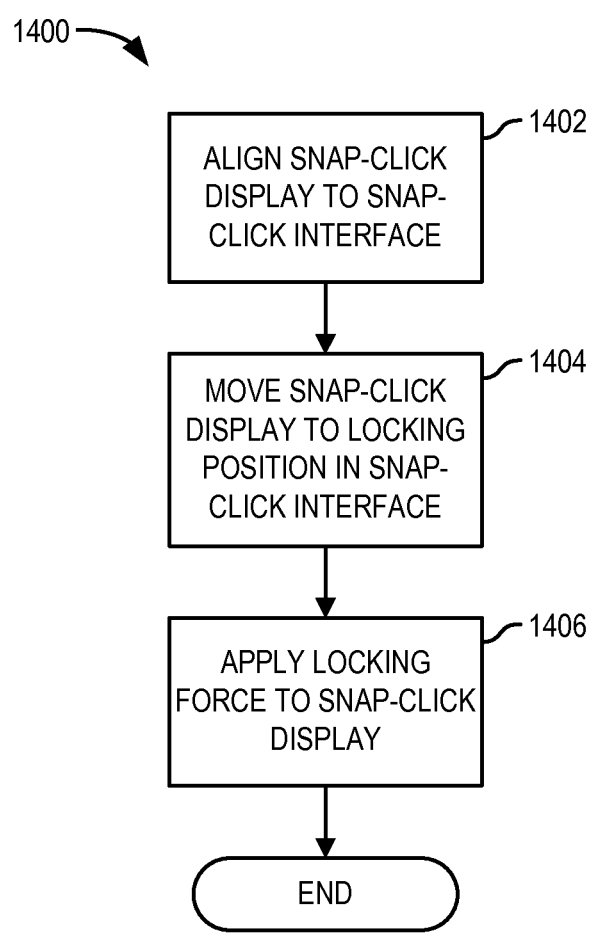
FIG. 14 is a flow diagram for installation of the snap-and-click display, according to one embodiment.

FIG. 14 is a flow diagram for installation of the snap-and-click display 1400, according to one embodiment. In one example, the method may include aligning the snap-and-click display with the interface within electronic gaming device 100 (step 1402). The method may include moving the snap-and-click display to one or more locking positions in snap-and-click interface (step 1404). The method may include applying locking force 1406 to snap-and-click display (step 1406). The method may end. In another example, one or more electrical interconnection points 1206, one or more electrical attachment points 609, and/or one or more electrical attachment devices 509 may be connected (e.g., physically and/or electrically).

Figure 15:
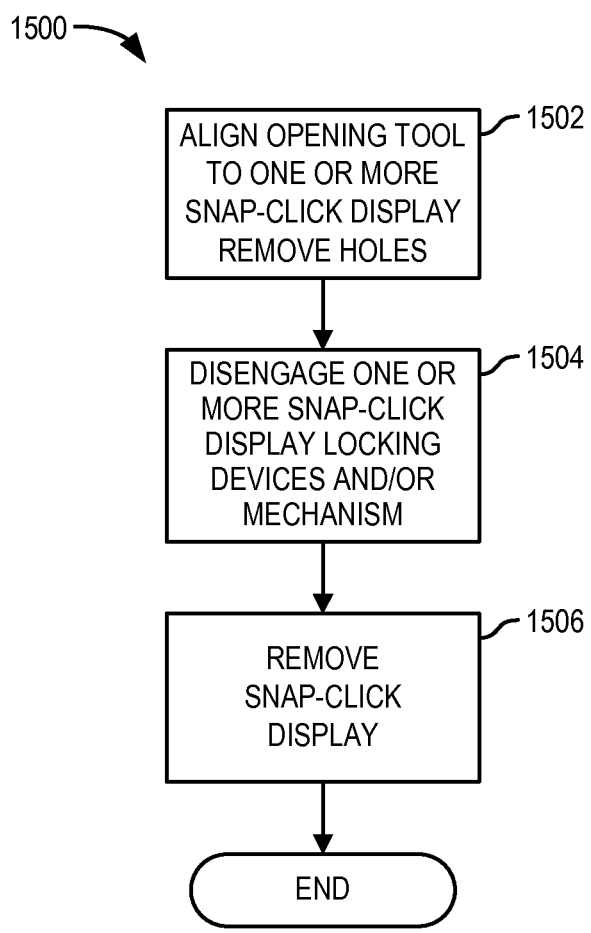
FIG. 15 is a flow diagram for uninstalling the snap-and-click display, according to one embodiment.

FIG. 15 is a flow diagram for uninstalling the snap-and-click display 1500, according to one embodiment. The method may include aligning opening tool to one or more snap-and-click display removal holes (step 1502). The method may include disengaging one or more snap-and-click display locking devices and/or mechanism (step 1504). The method may include removing the snap-and-click display (step 1506). The method may end.

Figure 16:
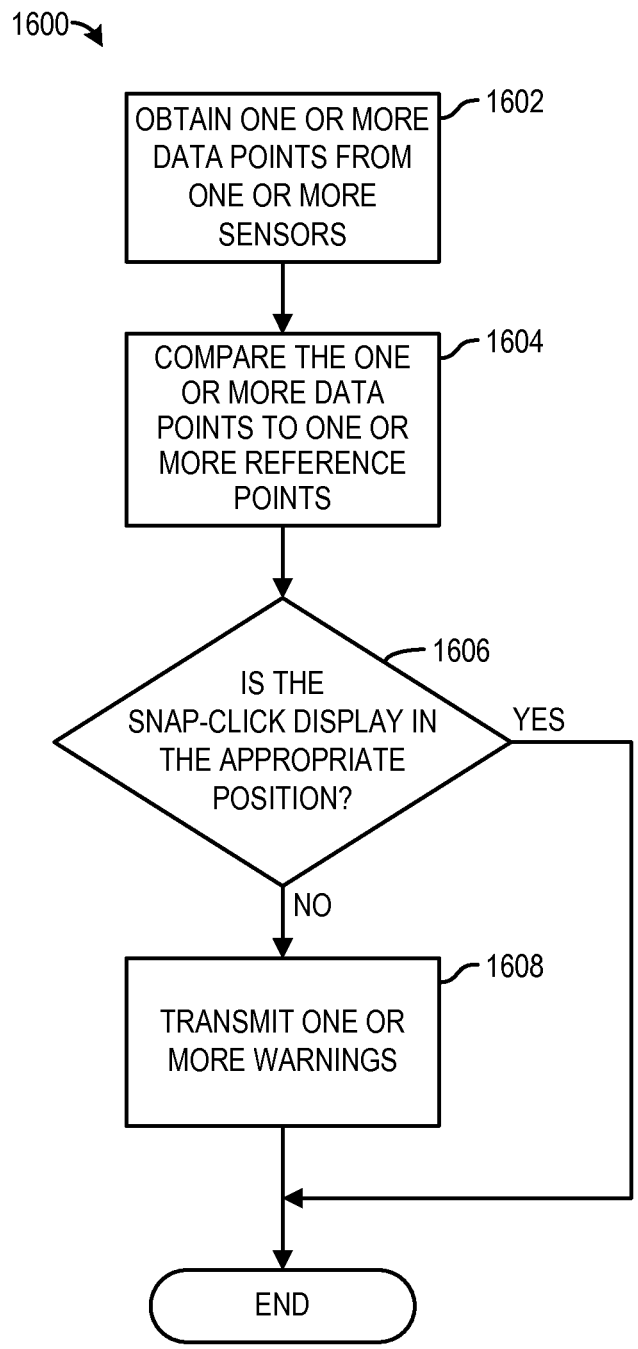
FIG. 16 is a flow diagram for verifying the installation of the snap-and-click display, according to one embodiment.

FIG. 16 is a flow diagram for verifying the installation of the snap-and-click display 1600, according to one embodiment. In one example, the method may include obtaining one or more data points from one or more sensors relating to one or more of electronic gaming device 100, the snap-and-click interface, and/or the snap-and-click display (step 1602). The method may include comparing the one or more data points to one or more reference points (step 1604). The method may include determining whether the snap-and-click interface and/or the snap-and-click display are in the appropriate positions and/or within a range of interrelationship positions with each other (step 1606). If the snap-and-click interface and/or the snap-and-click display are not in the appropriate positions and/or within a range of interrelationship positions with each other, then the method may transmit one or more warnings to an external device, to a server, to a mobile device and/or a warning device on electronic gaming device 100 (step 1608) and the method may end. If the snap-and-click interface and/or the snap-and-click display are in the appropriate positions and/or within a range of interrelationship positions with each other, then the method may end.

Any one or more of snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216 may be substituted in any of the process flow charts.

In one example, snap-and-click display may be aligned (e.g., in the correction position and/or within a tolerance range) with interface but not engaged with interface. One or more sensors may transmit this data to one or more processors, which may transmit one or more warnings.

In another example, snap-and-click may be aligned (e.g., in the correction position and/or within a tolerance range) with interface and engaged with interface. However, interface 504 may not be secured to electronic gaming device 100. One or more sensors may transmit this data to one or more processors, which may transmit one or more warnings.

Figure 17:
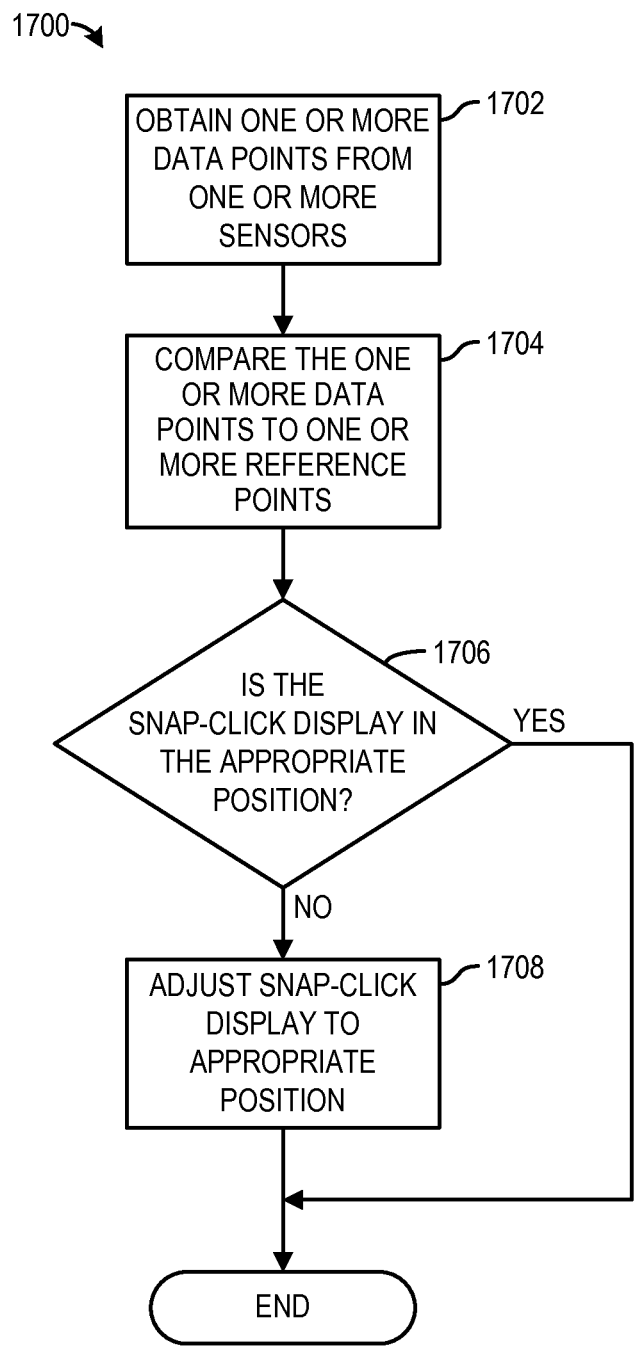
FIG. 17 is a flow diagram for adjusting the snap-and-click display, according to one embodiment.

FIG. 17 is a flow diagram for adjusting the installation of the snap-and-click display 1700, according to one embodiment. In one example, the method may include obtaining one or more data points from one or more sensors relating to one or more of electronic gaming device 100, the snap-and-click interface, and/or the snap-and-click display (step 1702). The method may include comparing the one or more data points to one or more reference points (step 1704). The method may include determining whether the snap-and-click interface and/or the snap-and-click display are in the appropriate positions and/or within a range of interrelationship positions with each other (step 1706). If the snap-and-click interface and/or the snap-and-click display are not in the appropriate positions and/or within a range of interrelationship positions with each other, then the method may adjust one or more adjustment devices to one or more appropriate positions (step 1708) and the method may end. If the snap-and-click interface and/or the snap-and-click display are in the appropriate positions and/or within a range of interrelationship positions with each other, then the method may end.

Any one or more of snap-and-click display 502, snap-and-click device 504, snap-and-click unlocking device 506, snap-and-click locking device 508, one or more electrical attachment devices 509, one or more attachment areas 510, electronic gaming device 100, electronic gaming system 200, display installation area 602, wall of the display installation area 604, back of the display installation area 606, one or more snap-and-click display interfaces 608, one or more electrical attachment points 609, an input area 610, one or more input devices 612, second display 614, snap-and-click display screen 702, one or more alignment lines 706, display interface locked area 1204, one or more electrical interconnection points 1206, one or more electrical wires 1208, one or more springs 1210, one or more motors 1214, one or more adjustable devices 1214, and/or one or more sensors 1216 may be substituted in any of the process flow charts.

In one example, snap-and-click display 502 may not be within a predetermined range of electronic gaming device 100. Based on snap-and-click display 502 not being within a predetermined range of electronic gaming device 100, one or more adjustable devices 1214 (and/or one or more springs 1210) may move snap-and-click display 502, any element of snap-and-click display 502 (e.g., snap-and-click device 504, etc.), display installation area 606, any element of display installation area 606 (e.g., one or more snap-and-click display interfaces 608, etc.), any element of electronic gaming device 100, and/or any element of electronic gaming system 200 to one or more correcting points.

In another example, snap-and-click device 504 may not be within a predetermined range of one or more snap-and-click display interfaces 608. Based on snap-and-click device 504 not being within a predetermined range of one or more snap-and-click display interfaces 608, one or more adjustable devices 1214 (and/or one or more springs 1210) may move snap-and-click display 502, any element of snap-and-click display 502 (e.g., snap-and-click device 504, etc.), display installation area 606, any element of display installation area 606 (e.g., one or more snap-and-click display interfaces 608, etc.), any element of electronic gaming device 100, and/or any element of electronic gaming system 200 to one or more correcting points.

In one example, one or more electrical attachment points 609 on display installation area 606 may not be connect to one or more electrical attachment devices 509 on snap-and-click display 502. Based on one or more electrical attachment points 609 on display installation area 606 not being connected to one or more electrical attachment devices 509 on snap-and-click display 502, one or more adjustable devices 1214 (and/or one or more springs 1210) may move snap-and-click display 502, any element of snap-and-click display 502 (e.g., snap-and-click device 504, etc.), display installation area 606, any element of display installation area 606 (e.g., one or more snap-and-click display interfaces 608, etc.), any element of electronic gaming device 100, and/or any element of electronic gaming system 200 to one or more correcting points.

Figure 18:
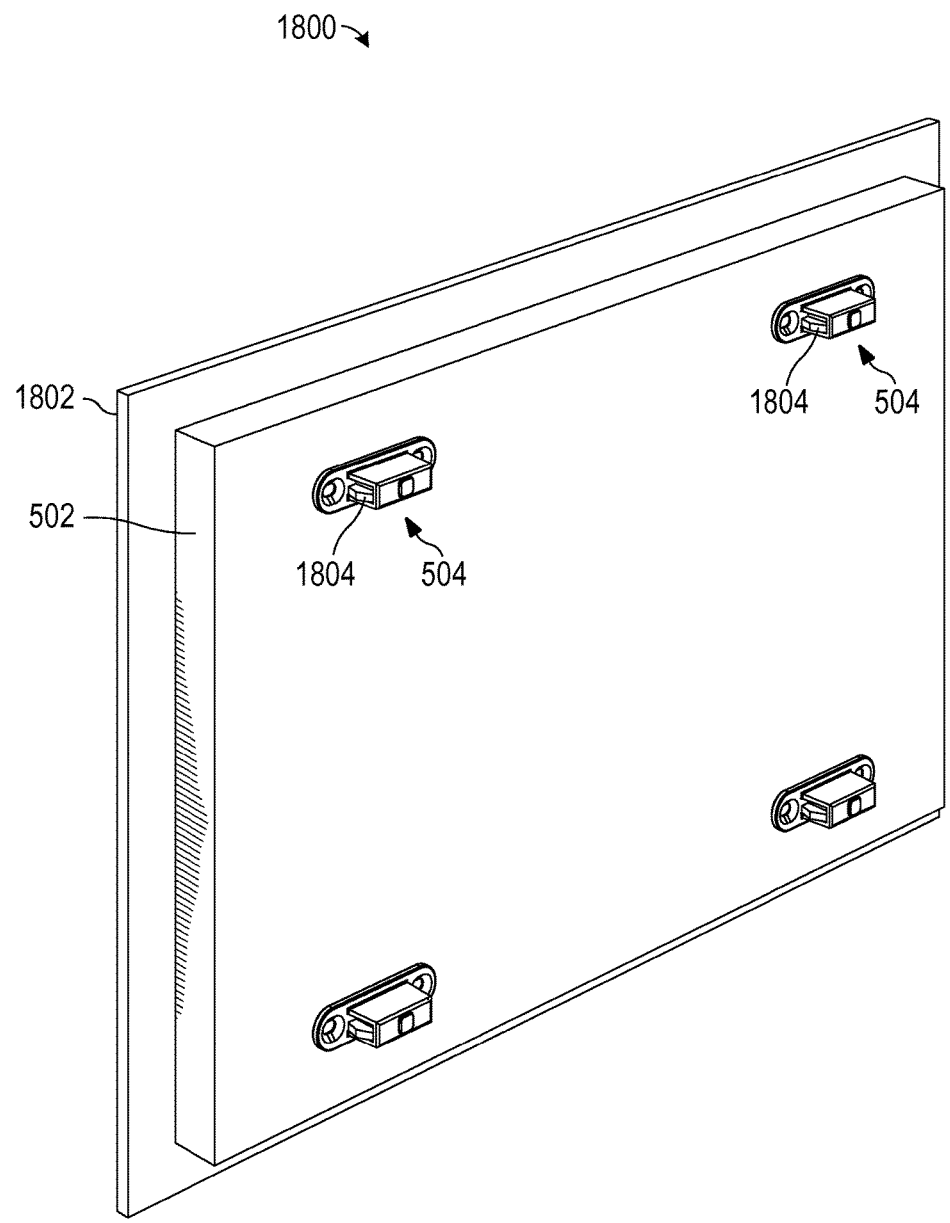
FIG. 18 is an illustration of a snap-and-click display, according to one embodiment.
Figure 19:
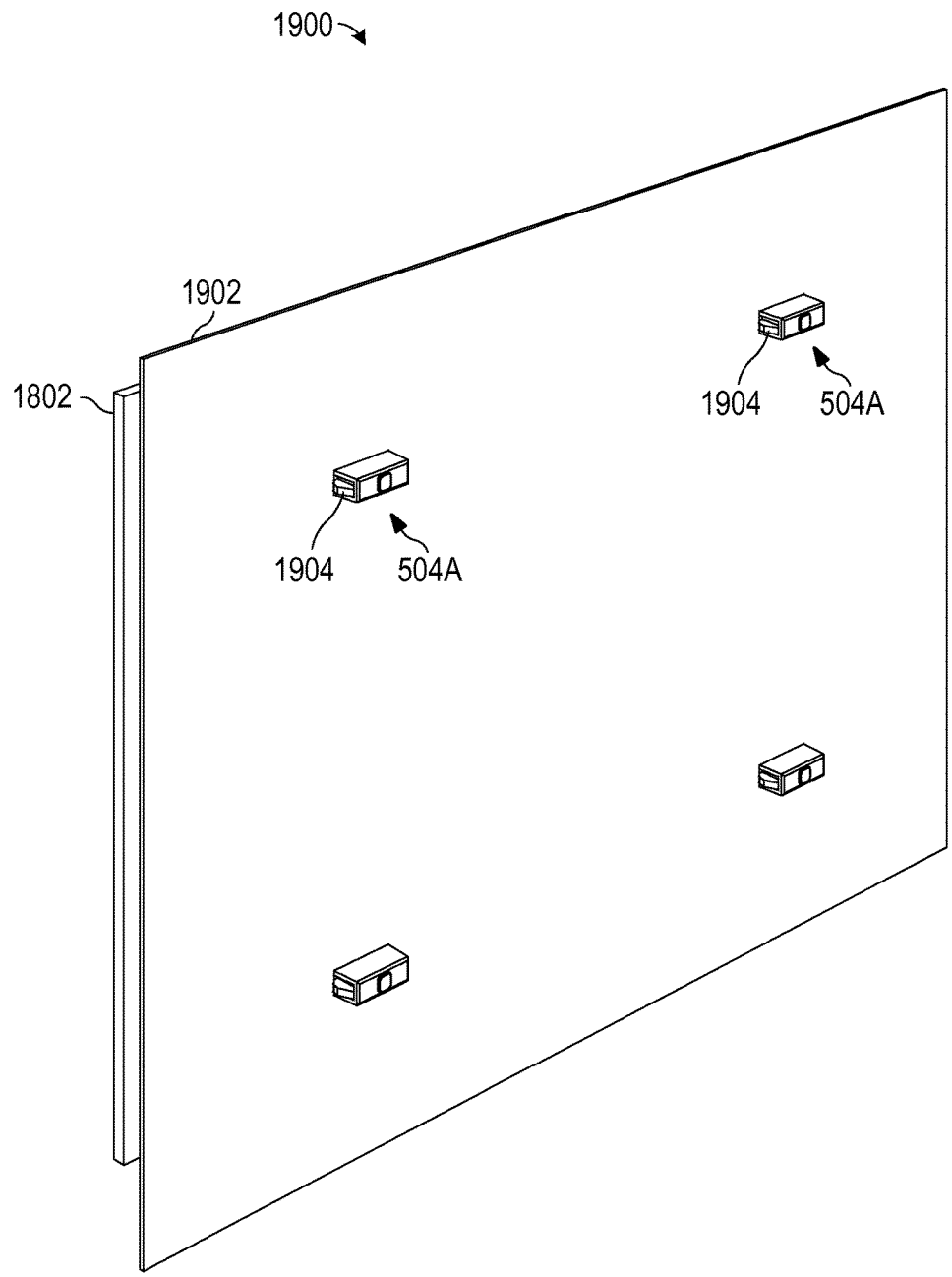
FIG. 19 is another illustration of a snap-and-click display, according to one embodiment.

In FIG. 18, a first back image of snap-and-click display 1800 may include a slot machine area 1802, snap-and-click display 502, snap-and-click device 504, and a snap-and-click device tab in a locking position 1804. In one example, when snap-and-click device tab is in a locking position 1804, snap-and-click device 504 (and/or snap-and-click display 502) may be locked into one or more positions. In another example, a second back image of snap-and-click display 1900 (see FIG. 19) may include a display area 1902 and a snap-and-click device in an unlocked position 504A. In this example, snap-and-click device 504 is in unlocked position 504A because one or more snap-and-click device tabs are in an unlocked position 1904.

Figure 20:
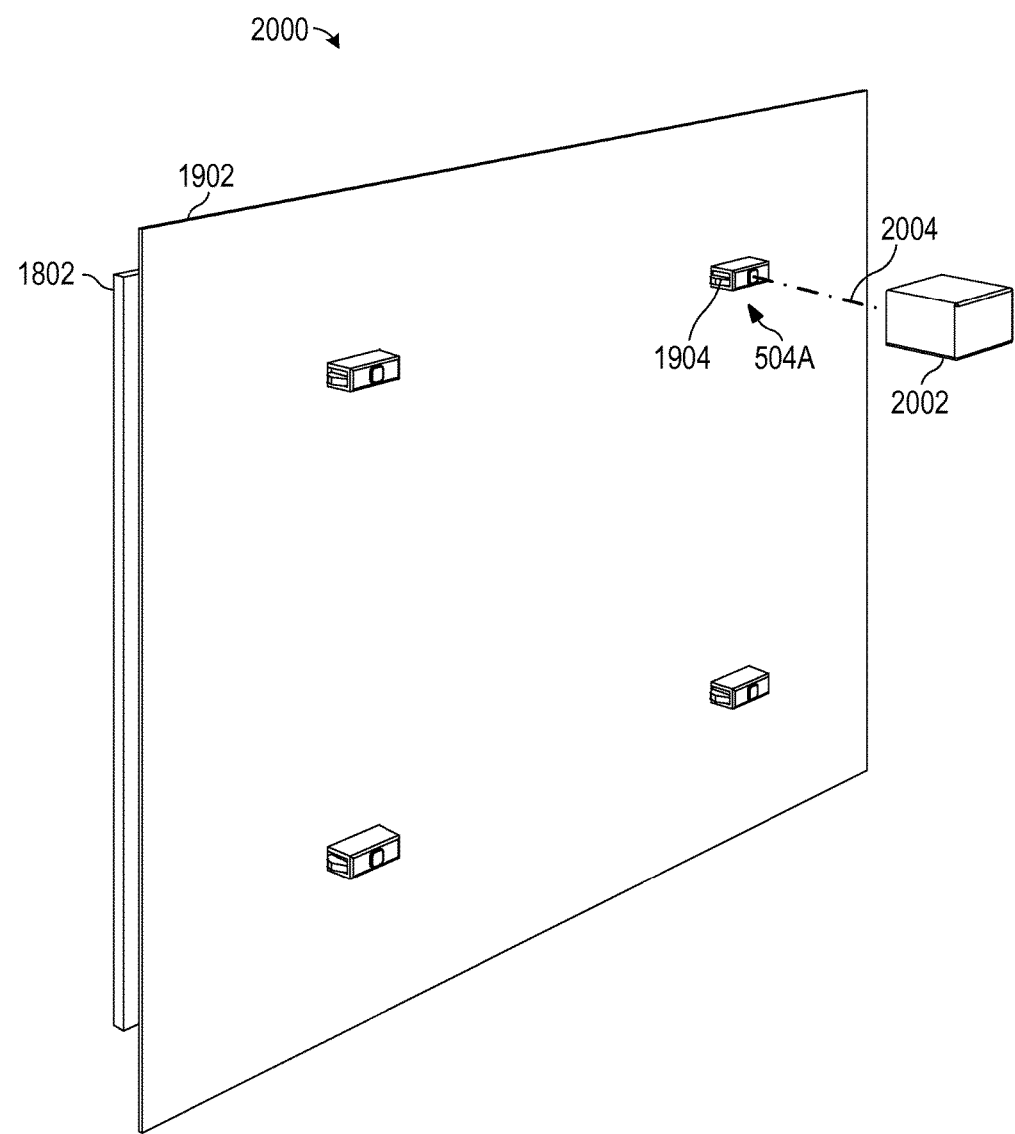
FIG. 20 is another illustration of a snap-and-click display, according to one embodiment.
Figure 21:
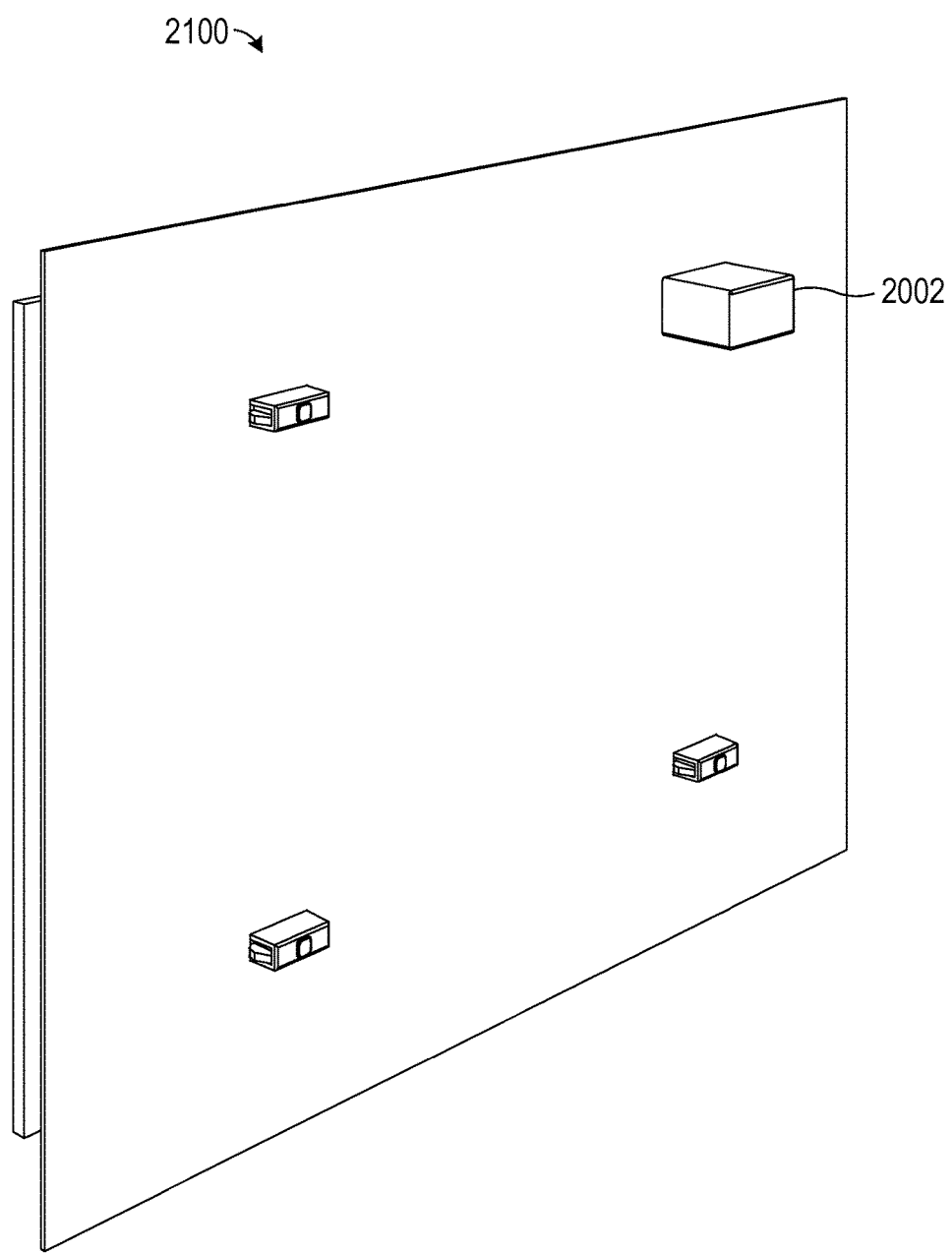
FIG. 21 is another illustration of a snap-and-click display, according to one embodiment.
Figure 22:
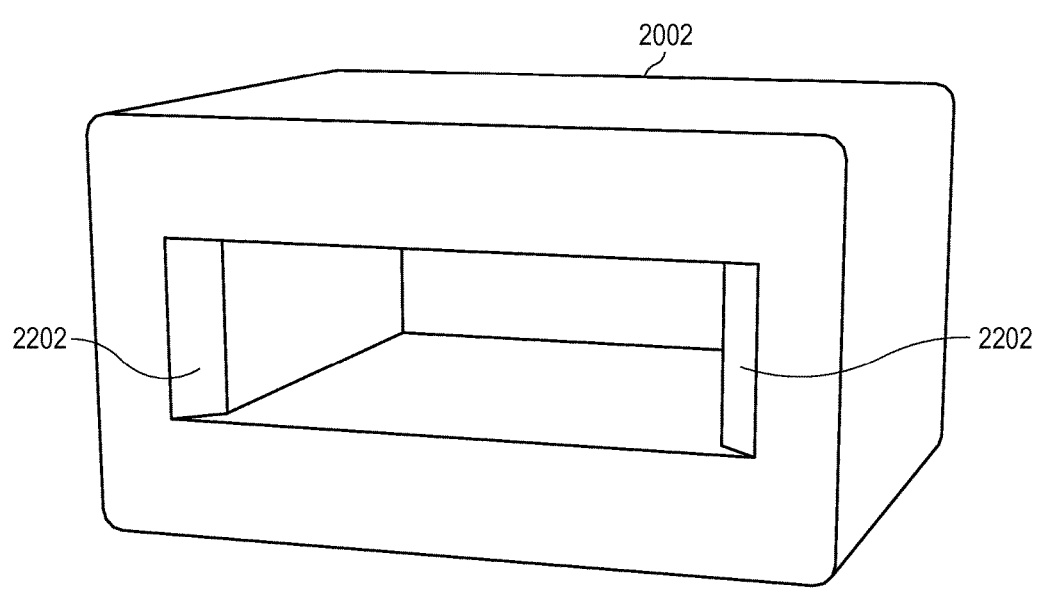
FIG. 22 is an illustration of an unlock device from a snap-and-click display, according to one embodiment.

In FIG. 20, a third back image of snap-and-click display 2000 may include an unlocking device 2002 moving towards snap-and-click device 504 via a first path 2004. Once unlocking device 2002 is placed over snap-and-click device 504, snap-and-click device 504 is in unlocked position 504A because snap-and-click device tap(s) are in unlocked position 1904 (see FIG. 21). In one example, unlocking device 2002 may include an outer surface with one or more hollow areas 2202 which may be placed over one or more snap-and-click devices 504 to place one or more tabs in one or more unlocked positions 1904 (see FIG. 22). In another example, snap-and-click display 502 and/or snapand-click device 504 may be removed/unlocked/moved by applying one or more of a removing, unlocking, and/or moving force.

In one embodiment, the electronic gaming device may include a plurality of reels. The one or more paylines may be formed on at least a portion of the plurality of reels. The electronic gaming device may include a memory.

In one embodiment, the electronic gaming device may include a display interconnection area. The display interconnection area may include an interface. The interface may include one or more connection areas. The one or more connection areas may connect with a snap-and-click display.

In another example, the display interconnection area may include one or more electrical connection areas. The snap-and-click display may include one or more electrical connection devices. The one or more electrical connection areas and the one or more electrical connection devices may be connected to each other. In another example, the one or more electrical connection areas and the one or more electrical connection devices may be electrically coupled to each other. In another example, the one or more processors may monitor a status of an electrical connection between the one or more electrical connection areas and the one or more electrical connection devices. In another example, the snap-and-click display may include one or more snap-and-click locking devices.

In another example, the one or more snap-and-click locking devices may be released by contact with one or more unlocking points. In another example, the one or more snap-and-click locking devices may detach an electrical connection between the one or more electrical connection areas and the one or more electrical connection devices based on contact with the one or more unlocking points.

In one embodiment, a method may include aligning a snap-and-click display with one or more interconnection areas on a display interconnection area. The method may include placing the snap-and-click display into one or more interconnection points. The method may include placing the snap-and-click display into one or more lock positions with one or more interconnection points. The method may include locking one or more snap-and-click locking devices.

In another example, the method may include connecting one or more electrical connection areas on the display interconnection area and one or more electrical connection devices on the snap-and-click display.

In one example, the method may include electrically connecting one or more electrical connection areas on the display interconnection area and one or more electrical connection devices on the snap-and-click display. The method may include measuring at least one of positional data and electrical data relating to one or more of the snap-and-click display and the one or more interconnection areas on the display interconnection area. The method may include transmitting at least one of one or more positional data and one or more electrical data relating to the one or more of the snap-and-click display and the one or more interconnection areas on the display interconnection area. The method may include comparing at least one of the one or more positional data and the one or more electrical data to one or more references. The method may include transmitting one or more warning based on a comparison of at least one of the one or more positional data and one or more electrical data to one or more references. The method may include transmitting one or more statuses based on a comparison of at least one of the one or more positional data and the one or more electrical data to one or more references.

In another embodiment, the interface for an electronic gaming device may include a surface including one or more attachment areas. The one or more attachment areas may attach to a snap-and-click display via one or more snap-and-click securing devices. The surface may include one or more electrical interconnection areas. The one or more electrical interconnections areas may be electrically coupled to the snap-and-click display.

In another example, the one or more snap-and-click locking devices may be released by contact with one or more unlocking points. The one or more snap-and-click locking devices may detach an electrical connection between the one or more electrical interconnection areas and the snap-and-click display based on contact with the one or more unlocking points.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

What is claimed is:

1. An electronic gaming device comprising:
   a housing;
   a door movably connected to the housing and located at a front of the housing, the door having a front and a rear, the door comprising a display interconnection area, the display interconnection area including an interface with one or more connection areas, the display interconnection area being located at the front of the door and facing outwardly therefrom;
   a snap-and-click video display, the snap-and-click video display having a front and a rear, the rear facing the front of the door and the front of the snap-and-click video display facing outwardly of the door; and
   at least one snap-and-click connector disposed on the rear of the snap-and-click video display, the at least one snap-and-click connector being configured to connect with the one or more connection areas, and the at least one snap-and-click connector being accessible from the rear of the door.

2. The electronic gaming device of claim 1, wherein the display interconnection area further includes one or more electrical connection areas.

3. The electronic gaming device of claim 2, wherein the snap-and-click display further includes one or more electrical connection devices.

4. The electronic gaming device of claim 3, wherein the one or more electrical connection areas and the one or more electrical connection devices are configured to be connected to each other.

5. The electronic gaming device of claim 4, wherein the one or more electrical connection areas and the one or more electrical connection devices are configured to be electrically coupled to each other.

6. The electronic gaming device of claim 5, wherein one or more processors monitor a status of an electrical connection between the one or more electrical connection areas and the one or more electrical connection devices.

7. The electronic gaming device of claim 1, wherein the at least one snap-and-click connector is configured to be released by contact with one or more unlocking points accessible from the rear of the door.

8. An electronic gaming device comprising:
   a housing;
   a door movably connected to the housing and located at a front of the housing, the door having a front and a rear, the door comprising a display interconnection area, the display interconnection area including an interface with one or more connection areas, the display interconnection area being located at the front of the door and facing outwardly therefrom;
   a video display, the video display having a front and a rear, the rear facing the front of the door and the front of the video display facing outwardly of the door; and
   at least one biased locking connector disposed on the rear of the video display, the at least one biased locking connector being configured to connect with the one or more connection areas, and the at least one biased locking connector being accessible from the rear of the door.

9. The electronic gaming device in accordance with claim 8, wherein the biased locking connector comprises a body having at least one locking device extending outwardly therefrom, the at least locking device movable between a first inward unlocking position and a second outward locking position.

10. The electronic gaming device in accordance with claim 9 wherein the connection area is configured press the at least one locking device to the first inward unlocking position to accept the at least one locking device and the at least one locking device then moving to the second outward locking position to lock the at least one biased locking connector to the connection area.

11. The electronic gaming device of claim 8, wherein the at least one locking device is configured to be released from the second outward locking position by contact with one or more unlocking points which are accessible from the rear of the door.

12. The electronic gaming device of claim 8, wherein the at least one biased locking connector protrudes from a back surface of the video display, the at least one biased locking connector comprising two securing latches biased outward from side surfaces of the at least one biased locking connector, and an unlocking device disposed on a back surface of the at least one biased locking connector.

13. The electronic gaming device of claim 12, wherein the securing latches are configured to be pressed inwardly towards the at least one biased locking connector when the at least one biased locking connector is pressed into the connection area, the connection area comprising an opening in the display interconnection area and configured to bias back outwardly and lock the at least one biased locking connect into engagement with the door.

* * * * *